Dec. 9, 1969    W. R. JEFFERSON    3,482,444
ELECTRICAL BOAT-SPEEDOMETER APPARATUS
Filed Nov. 2, 1967
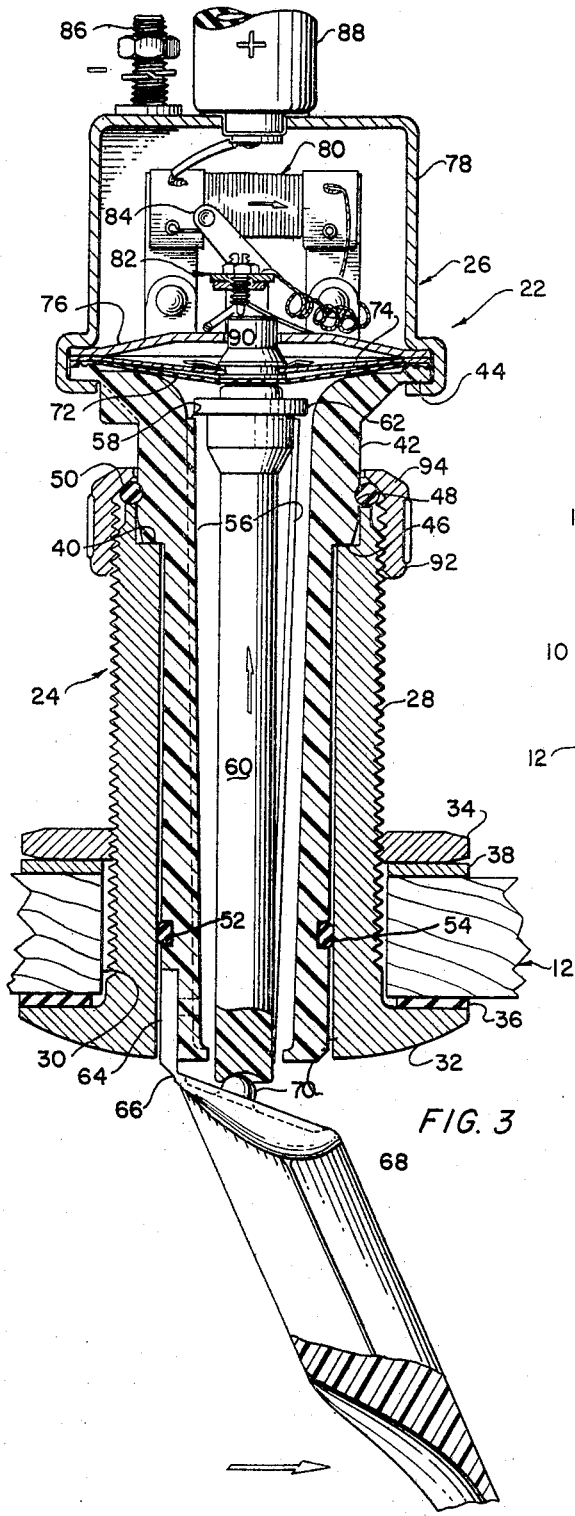
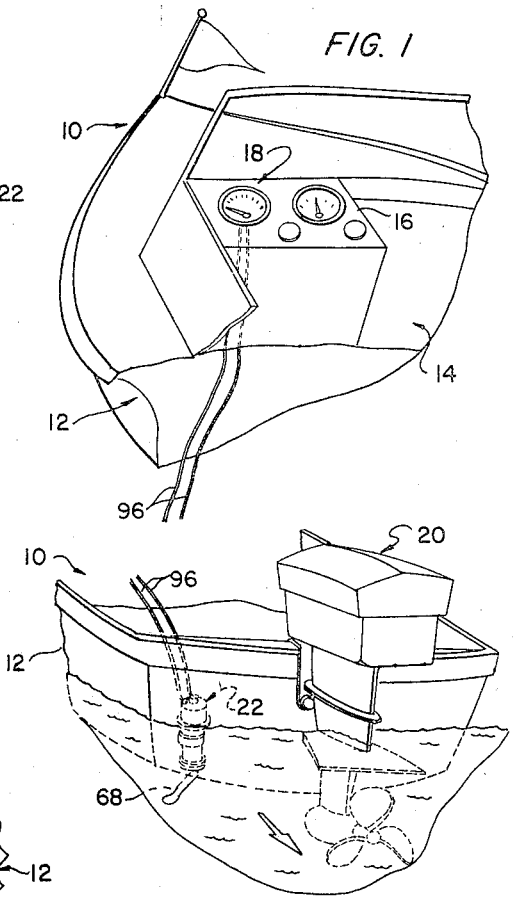
FIG. 1
FIG. 2
FIG. 3
INVENTOR
Walter R. Jefferson
By *Norton Lesser*
Attorney

United States Patent Office 3,482,444
Patented Dec. 9, 1969

3,482,444
ELECTRICAL BOAT-SPEEDOMETER APPARATUS
Walter R. Jefferson, Mount Prospect, Ill., assignor to Stewart-Warner Corporation, Chicago, Ill., a corporation of Virginia
Filed Nov. 2, 1967, Ser. No. 680,107
Int. Cl. G01c 21/00
U.S. Cl. 73—186                 5 Claims

ABSTRACT OF THE DISCLOSURE

An electrical boat-speed transmitter assembly including a tubular hull fitting, a tubular housing within the fitting, and a rheostat actuating spindle within the housing and being operable by a wand carried by the housing. Shoulder means are provided for positively locating the housing axially in the fitting, and seal means are provided between the housing and the fitting on opposite sides of the shoulder means.

BACKGROUND OF THE INVENTION

Field of the invention

The present invention relates generally to electrical boat-speedometer apparatus, and more particularly to an electrical boat-speed transmitter unit and mounting means therefor.

Description of the prior art

One type of electrical boat-speedometer apparatus comprises a speedometer indicator unit having suitable electrical connection with a boat-speed transmitter assembly. The transmitter assembly includes a vertical tubular fitting secured in the hull of the boat, a tubular housing within the fitting, a diaphragm extending across the top of the housing, and a spindle within the housing and being operable by a wand carried by the housing which is responsive to movement of the boat through water. The spindle is arranged to actuate rheostat means mounted above the diaphragm for controlling the flow of current to the speedometer indicator unit. Heretofore, difficulty has been experienced in positively locating the housing axially in the fitting, and in providing a satisfactory fluid seal between the housing and the fitting.

SUMMARY OF THE INVENTION

In accordance with the present invention, the fitting is provided with an interior annular radial shoulder, and the housing is provided with an exterior annular radial shoulder. Also, the housing is provided with an exterior annular recess in which is mounted an O-ring seal, and a locking nut is threaded on the fitting and engages the seal to hold the same in seating engagement with the fitting and to maintain the housing and fitting shoulders in engagement. The housing is further provided with an exterior annular groove in which is mounted an O-ring seal having sealing engagement with the fitting. The recess seal and the groove seal are arranged on opposite sides of the housing and fitting shoulders, and the described arrangement serves to positively locate the housing axially in the fitting and to provide an effective fluid seal between the housing and the fitting. Still further, the housing is provided with interior longitudinal ribs that define stop means, and the spindle is provided with a collar which is engageable with the stop means for limiting movement of the spindle outwardly of the housing.

BRIEF DESCRIPTION OF THE DRAWING

FIGURE 1 is a fragmentary perspective view of the bow of a motorboat, and shows an electrical boat-speed indicator unit;

FIGURE 2 is a fragmentary perspective view of the stern of the boat of FIGURE 1, and shows the electrical boat-speed transmitter assembly of the present invention; and FIGURE 3 is an enlarged median vertical sectional view of the transmitter assembly of FIGURE 2.

DESCRIPTION OF THE PREFERRED EMBODIMENT

Referring now to FIGURES 1 and 2, there is indicated generally by the reference numeral 10 a motorboat having a hull 12 with a cockpit 14 and an instrument panel 16 in which is mounted an electrical boat-speedometer 18. Mounted on the stern of the boat is an outboard motor 20, and mounted in the bottom of the hull of the boat adjacent the stern is an electrical boat-speed transmitter assembly 22 incorporating the principles of the present invention. As shown in FIGURE 3, the transmitter assembly 22 includes a hull mounting unit 24 and a transmitter unit 26.

The hull mounting unit 24 comprises an elongated tubular fitting 28 inserted vertically through an opening 30 in the bottom of the hull 12, and having a radial flange 32 at the lower end thereof. The fitting 28, which is fabricated of a metal such as brass, is exteriorly threaded for receiving a nut 34. A gasket 36 is interposed between the hull 12 and flange 32, a washer 38 is interposed between the hull 12 and nut 34, and the nut 34 is tightened to secure the fitting 28 in the hull 12. The fitting 28 is also provided with an interior annular radial shoulder 40 adjacent the upper end thereof.

The transmitter unit 26 is comprised of an elongated tubular housing 42 fabricated of a plastic such as Lexan. The housing 42 has an upper radially outwardly flared flange portion 44, and an exterior annular radial shoulder 46 adjacent the upper end thereof. The housing 42 is also provided with an exterior annular recess 48 adjacent the upper end thereof in which is mounted an O-ring seal 50, and an exterior annular groove 52 adjacent the lower end thereof in which is mounted an O-ring seal 54. The housing 42 is further provided with interior longitudinal ribs 56 that define stop means 58 adjacent the upper end thereof. Slidable within the housing 42 is a spindle 60 having an annular collar 62 at its upper end which is engageable with the stop means 58. Secured in the lower end of the housing 42 is a hinge element 64 having an integral yieldable junction at 66 with a depending wand 68 at the upper end of which is provided a boss 70 that engages the lower end of the spindle 60. The hinge element 64, wand 68 and boss 70 are integrally formed of a material such a polypropylene.

Extending across the upper end of the housing 42 is a resilient diaphragm 72, a flexible disc 74, and a rigid disc 76, which are held in position by a casing 7 secured about the housing flange 44. Mounted on the rigid disc 76 are a rheostat 80, and a rocker assembly 82 which may be pivoted about a horizontal axis and which carries a control arm 84 movable across the rheostat 80. The casing 78 is provided with suitable electrical terminals 86 and 88 for the rheostat 80. Also, a button 90 is secured in the flexible disc 74, projects upwardly through an opening in the rigid disc 76, and engages the rocker assembly 82 for rheostat operation.

In assembly, the wand 68 and the housing 42 are inserted downwardly through the fitting 28, and a locking nut 92 with an annular inwardly directed rim 94 is threaded on the upper end of the fitting 28. The housing shoulder 46 engages the fitting shoulder 40 for positively locating the housing axially in the fitting, the locking nut rim 94 engages the seal 50 to hold the same in seating engagement with the upper end of the fitting 28 and to maintain the housing 42 in its axially located position, and the seal 52 has sealing engagement with the bore of the fitting 28. With this mounting arrangement, the housing 42 is effectively located and sealed in the fitting 28. In a conventional manner, the terminals 86 and 88 are connected by wires 96 with the electrical speed indicator unit 18.

As the boat 10 is propelled through water by the motor 20, the wand 68 pivots counterclockwise, as viewed in FIGURE 3, in proportion to the speed of movement of the boat. The boss 70 thereby effects upward movement of the spindle 60 which, in turn, causes upward movement of the diaphragm 72, disc 74 and button 90. The rocker assembly 82 is pivoted by the button 90, and the control arm 84 is moved across the rheostat 80 and positioned in accordance with boat speed. In this manner, the resistance in the electrical circuit of the speedometer 18 is varied in proportion to boat speed, and the resultant current flow serves to locate the indicator of the speedometer 18 at the appropriate speed indicia. Upon cessation of movement of the boat, the components of the transmitter unit 26 return to the position shown in FIGURE 3. The spindle 60, which serves as a rheostat actuator, is limited in its downward movement by engagement of the collar 62 with the stop means 58.

While there has been shown and described a preferred embodiment of the present invention, it will be understood by those skilled in the art that various rearrangements and modifications may be made therein without departing from the spirit and scope of the invention.

I claim:
1. In an electrical boat-speed transmitter assembly, an elongated tubular fitting adapted to be secured vertically in the hull of a boat, an elongated tubular housing disposed in the tubular fitting, a diaphragm extending across the upper end of the housing, a vertical rheostat actuating spindle within the housing and at the upper end engaging the diaphragm, a wand secured at the lower end of the housing and engaging the lower end of the spindle for effecting vertical movement of the latter in response to movement through water, said fitting is provided with an interior annular radial shoulder adjacent the upper end thereof, and said housing is provided with an exterior annular radial shoulder adjacent the upper end thereof which engages said interior shoulder for positively locating said housing axially in said fitting.

2. In an electrical boat-speed transmitter assembly, an elongated tubular fitting adapted to be secured vertically in the hull of a boat, an elongated tubular housing disposed in the tubular fitting, a diaphragm extending across the upper end of the housing, a vertical rheostat actuating spindle within the housing and at the upper end engaging the diaphragm, a wand secured at the lower end of the housing and engaging the lower end of the spindle for effecting vertical movement of the latter in response to movement through water, means for positively locating said housing axially in said fitting, said housing is provided with an exterior annular recess adjacent the upper end thereof, an O-ring seal is mounted in said recess and seats against the upper end of said fitting, and a locking nut is threaded on the upper end of said fitting and is provided with an annular inwardly directed rim that engages said seal to hold the same in seating engagement with said upper end of said fitting and to maintain said housing in its axially located position.

3. The improvement of claim 1 wherein said housing is provided with an exterior annular recess adjacent the upper end thereof, an O-ring seal is mounted in said recess and seats against the upper end of said fitting, and a locking nut is threaded on the upper end of said fitting and is provided with an annular inwardly directed rim that engages said seal to hold the same in seating engagement with said upper end of said fitting and to maintain said housing shoulder in engagement with said fitting shoulder.

4. The improvement of claim 5 wherein said housing is provided with an exterior annular groove adjacent the lower end thereof, and an O-ring seal is mounted in said groove and has sealing engagement with said fitting.

5. In an electrical boat-speed transmitter assembly, an elongated tubular fitting adapted to be secured vertically in the hull of a boat, an elongated tubular housing disposed in the tubular fitting, a diaphragm extending across the upper end of the housing, a vertical rheostat actuating spindle within the housing and at the upper end engaging the diaphragm, a wand secured at the lower end of the housing and engaging the lower end of the spindle for effecting vertical movement of the latter in response to movement through water, means for positively locating said housing axially in said fitting, said housing is provided with interior longitudinal ribs that define stop means adjacent the upper end thereof, and said spindle is provided with an annular collar at its upper end which is engageable with said stop means for limiting downward movement of said spindle.

References Cited

UNITED STATES PATENTS

| | | | |
|---|---|---|---|
| 170,720 | 12/1875 | Elliott | 73—186 |
| 3,380,302 | 4/1968 | Gelinas | 73—228 |

DONALD O. WOODIEL, Primary Examiner